Jan. 20, 1925.  
H. YPMA  
1,523,926
HELICOPTER
Filed March 26, 1923  2 Sheets-Sheet 2
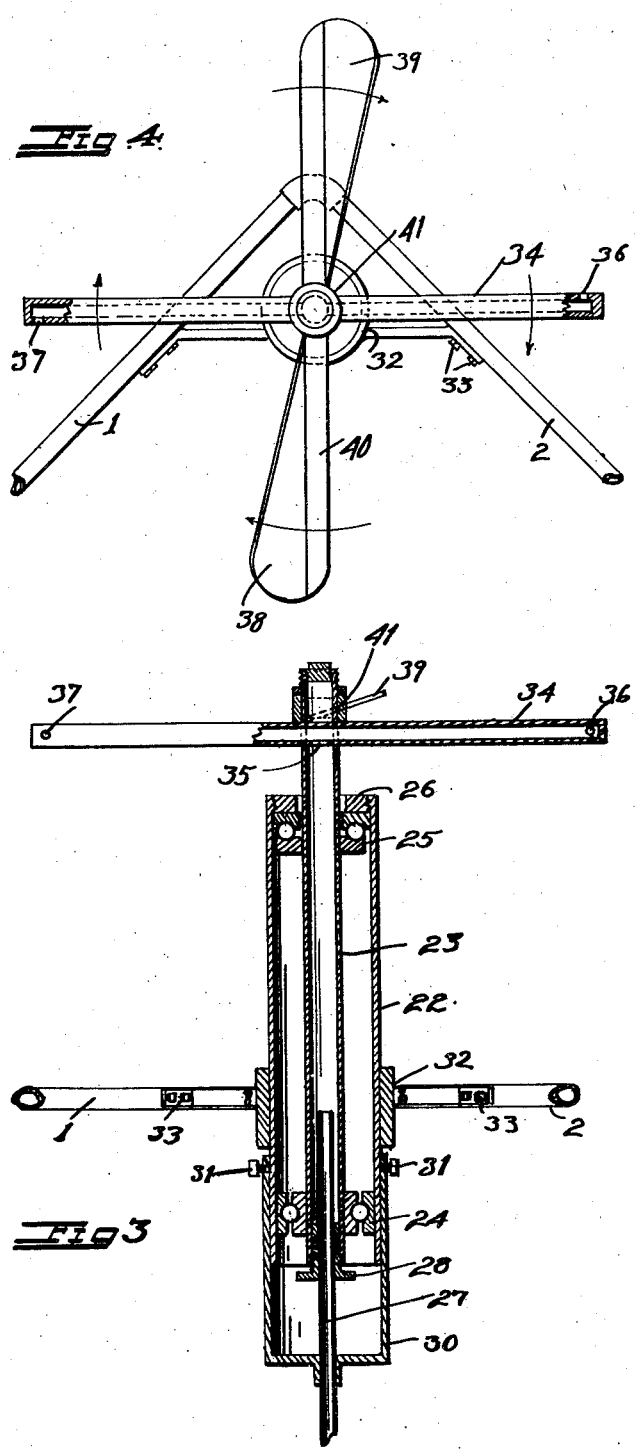
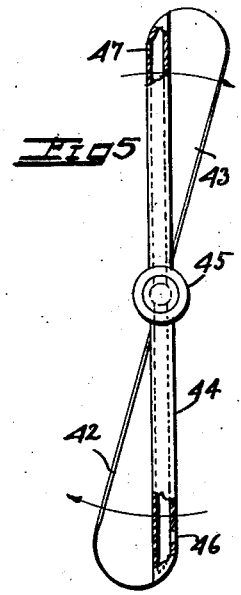
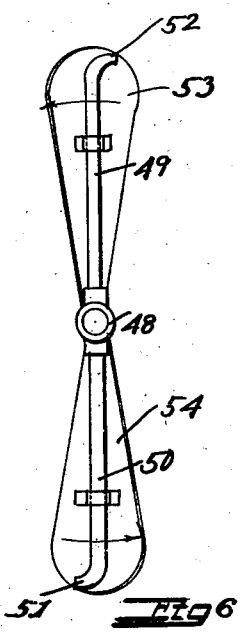
INVENTOR  
Harry Ypma.  
BY  
ATTORNEYS Patented Jan. 20, 1925.

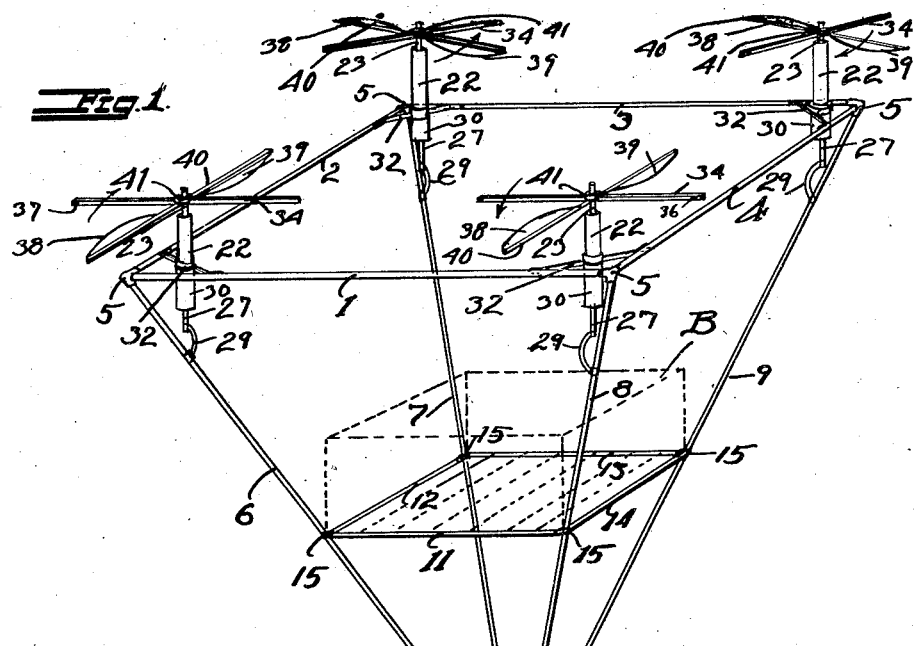

1,523,926

UNITED STATES PATENT OFFICE.

HARRY YPMA, OF LOS ANGELES, CALIFORNIA.

HELICOPTER.

Application filed March 26, 1923. Serial No. 627,774.

*To all whom it may concern:*

Be it known that I, HARRY YPMA, a citizen of the United States, and a resident of Los Angeles, county of Los Angeles, and State of California, have invented a new and useful Helicopter, of which the following is a specification.

This invention relates to improvements in helicopters of the captive type, and one of the objects of the invention is to provide means for driving propellers attached to a frame whereby the frame will be lifted vertically from a source of power on the ground.

Another object is to provide a helicopter with a frame and sufficient power to carry up several persons for the purpose of amusement, or for observation, as the captive balloon is now used.

Another object is to provide a very light but strong frame, with propellers mounted thereon, the propellers being driven by compressed air, gas or the like, discharged in and reacting on the atmospheric air, the pressure means being conducted from a compressor through lengths of tubing flexibly connected together, and to the frame, the tubular members of the frame conducting the pressure means to the propellers. Another object is to provide means for driving a helicopter without gears, or power plant on the helicopter itself.

Other objects and advantages will be apparent to those skilled in the art as the description proceeds, reference being had to the accompanying drawings in which Figure 1 is a perspective view of the helicopter showing connections to the air compressor; Figure 2 is a sectional view of the flexible joint for connecting the lengths of tubing; Figure 3 is a sectional view of the propeller driving unit; Figure 4 is a plan of the unit shown in Figure 3; Figure 5 is a plan of a modified form of propeller; and Figure 6 is another modified form of propeller.

The numerals (1) to (4) inclusive indicate a square frame made of tubing joined at the corners by suitable fittings (5). Connected to the fittings (5) are the tubes (6) to (9) inclusive, which extend downwardly and connect to the coupling (10). The tubes (6) to (9) inclusive are joined to the tubes (11) to (14) by means of suitable fittings (15). The compressor (16) is connected to the coupling (10) by the tubes (17) which have the flexible joints (18) to allow of the tubes stacking up as shown at A.

The flexible joint (18) can be made in any suitable way. In this instance one end of one tube has a projection (19) fitting into the opposite end of the joining tube in the recess (20), a bolt (21) holding the tubes together. The transmitting or propeller driving unit consists of the tube (22) in which is mounted the propeller shaft (23) on ball bearings (24) and (25). The thrust of the upper bearing (25) is taken by the collar (26). The propeller shaft (23) is hollow, and has a pipe (27) extending up into it, the stuffing box (28) closing the opening around the pipe. The pipe (27) is adapted to connect to any of the tubes (6) to (9) inclusive by means of the pipe (29). The cap (30) is attached to the tube (22) by the set screws (31) and is for the purpose of holding oil.

The shaft supporting unit is held to the frame by the bracket (32) and bolts (33). The propeller driving means consists of a hollow tube (34) connecting to the interior of the propeller shaft (23) by means of the opening (35). Nozzle openings (36) and (37) are provided to discharge the air near the ends of the tube, and in opposite directions, whereby the reaction of the compressed air against the atmospheric air will rotate the tube (34), and with it the shaft (23). Fixed at a right angle to the tube (34) is the propeller with the blades (38) and (39) the rib (40) and hub (41).

Any number of power units with propellers may be used by making the tubular frame to suit. In this instance four power units with propellers are shown, one mounted at each corner of the frame, two of the propellers to revolve in one direction and two in the opposite direction to prevent any tendency to side motion.

In the modified form of propeller and driving means shown in Figure 5, the propeller consists of blades (42) and (43) and a hollow rib (44) and hub (45). The hollow rib connects to the hollow propeller shaft and the propeller shaft is connected to the compressor by the tubular frame and the folding lengths of pipe, nozzle openings (46) and (47) being provided for the discharge of the compressed air into the atmosphere. The modified form of propeller shown in Figure 6 consists of a hub (48)

connected to the hollow shaft. Fixed in the hub are the tubes (49) and (50) bent at the ends as shown at (51) and (52) to form discharge nozzles. Attached to the tubes (49) and (50) are the propeller blades (53) and (54).

The operation of the helicopter is as follows: Compressed air is turned into the tubes (17) which carry it to the tubes (6) to (9) inclusive of the frame from where it is conveyed to the hollow shaft (23) by means of the connections (29) and the tubes (27). From the hollow shaft the compressed air passes through the openings (35) and the discharge nozzles (36) and (37) into the atmosphere, which causes the tubes (34) and with them the propellers to revolve. The latter have the blades set to lift the helicopter frame and connected tubing. A platform and railing is shown in dotted lines at B, Figure 1, for the use of passengers going up with the helicopter.

In addition to the advantages mentioned, the helicopter would be a great aid in fighting fires in high buildings, as firemen could be taken up with a line of hose beyond the reach of ladders. The propellers could also be operated by the high pressure water system which would be more available in this case.

While I have shown only the preferred form of the invention, it should be understood that various changes or modifications may be made within the scope of the claims hereto attached without departing from the spirit of the invention.

I claim:

1. A helicopter of the class described, comprising a frame having the form of an inverted pyramid, a separate lifting propeller mounted on the frame at each corner of its base, and a passenger supporting platform within the pyramid below the propellers and lying in a plane parallel with the base of the pyramid.

2. A captive helicopter of the class described comprising a polygonal frame constructed of tubular members, fluid operated power units connected one to each corner, respectively, of the tubular frame and communicating with the interior of the tubing, a seprate lifting propeller connected to each power unit for operation thereby, and a folding pipe line connecting the tubular frame with a source of fluid under pressure for operating the power units.

3. A captive helicopter of the class described, comprising a frame work of tubes adapted to carry compressed air therein, flexible tubes connecting said frame with a source of compressed air, power units mounted on said frame and adapted to receive compressed air from said frame, and propellers operated by said power units.

4. A captive helicopter of the class described, comprising a frame constructed of tubes adapted to carry compressed air therein a folding pipe line connecting said frame with a source of compressed air, power units carried by said frame adapted to receive air from said frame, a vertical hollow propeller shaft in each of said units, tubular arms projecting radially from said shaft and adapted to receive compressed air therefrom, nozzle openings adjacent the ends of said tubular arms for discharging the air therefrom whereby the tubular arms are revolved in a horizontal plane, and a screw propeller fixed to said propeller shaft at a right angle to said tubular arms.

5. A captive helicopter of the class described comprising a frame constructed of tubes and fittings adapted to carry compressed air therein, a folding pipe line connecting said frame with a source of compressed air, power units carried by said frame, an enclosing tube for each of said units, a cap on the lower end of said tube, a hollow propeller shaft mounted on roller bearings in said tube, a pipe connecting the inside of said propeller shaft with a tubular member of said frame, packing around said pipe in said propeller shaft, a propeller on said shaft, a hollow tubular member at right angles to said propeller, and discharge nozzles in said tubular member adapted to revolve said tubular member by the reaction of compressed air on the atmospheric air.

HARRY YPMA.